United States Patent
Moradnouri et al.

(10) Patent No.: US 8,320,086 B1
(45) Date of Patent: Nov. 27, 2012

(54) DISK DRIVE CRASH STOP INCLUDING A HELICAL PORTION

(75) Inventors: Farial Moradnouri, San Jose, CA (US); Arman V. Golgolab, Los Altos, CA (US); Jason T. Weaver, Morgan Hill, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 116 days.

(21) Appl. No.: 12/825,232

(22) Filed: Jun. 28, 2010

(51) Int. Cl.
*G11B 5/55* (2006.01)
*G11B 33/12* (2006.01)

(52) U.S. Cl. .................................. 360/265.1

(58) Field of Classification Search ............ 360/256.2, 360/265.1
See application file for complete search history.

(56) References Cited

U.S. PATENT DOCUMENTS

| | | | |
|---|---|---|---|
| 4,110,802 A | 8/1978 | Ho et al. | |
| 4,110,867 A * | 9/1978 | Gwozdz | 16/82 |
| 4,237,504 A | 12/1980 | Ho et al. | |
| 4,603,363 A * | 7/1986 | Rickert et al. | 360/86 |
| 4,716,482 A * | 12/1987 | Walsh | 360/265.1 |
| 4,949,206 A | 8/1990 | Phillips et al. | |
| 5,402,290 A * | 3/1995 | Daniel | 360/265.1 |
| 5,864,449 A | 1/1999 | Dominguez, Jr. et al. | |
| 5,973,888 A | 10/1999 | Chawanya et al. | |
| 6,065,785 A * | 5/2000 | Mantarakis et al. | 292/181 |
| 6,125,017 A | 9/2000 | Misso et al. | |
| 6,207,911 B1 * | 3/2001 | Hirsch et al. | 200/61.81 |
| 6,535,471 B2 * | 3/2003 | Shinoda et al. | 720/641 |
| 6,567,242 B2 | 5/2003 | Misso et al. | |
| 6,680,823 B2 | 1/2004 | Wood et al. | |
| 6,826,019 B2 | 11/2004 | Misso et al. | |
| 7,061,723 B2 | 6/2006 | Price | |
| 2005/0286173 A1 | 12/2005 | Ratliff et al. | |

* cited by examiner

*Primary Examiner* — Angel A. Castro

(57) ABSTRACT

Described herein is a disk drive having a crash stop assembly that includes a crash stop section with an outer wall extending along a first axial length of the crash stop assembly and a retaining section extending from the crash stop portion. The retaining section includes a helical portion that is elastically compressible along a second axial length, different from the first axial length, of the crash stop assembly when a base and top cover of the disk drive are coupled together.

25 Claims, 5 Drawing Sheets

DISK DRIVE CRASH STOP INCLUDING A HELICAL PORTION

BACKGROUND

Hard disk drives, (HDD) are often used in electronic devices, such as computers, to record data onto or to reproduce data from a recording media, which can be a disk having one or more recording surfaces. The HDD also often includes a head for reading the data on a recording surface of the disk and for writing data unto one of the surfaces. An actuator is provided for moving the head over a desired location, or track of the disk.

The HDD includes a spindle motor for rotating the disk during operation. When the disk drive is operated, and the actuator moves the head over the disk, the head is floated a predetermined height above the recording surface of the disk while the disk is rotated, and the head detects and/or modifies the recording surface of the disk to retrieve, record, and/or reproduce data from and/or onto the disk.

When the HDD is not in operation, or when the disk is not rotating, the head can be rotated by the actuator to a position such that the head is not over the disk or the recording surfaces. In this non-operational configuration, the head is "parked off" of the recording surface of the disk.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
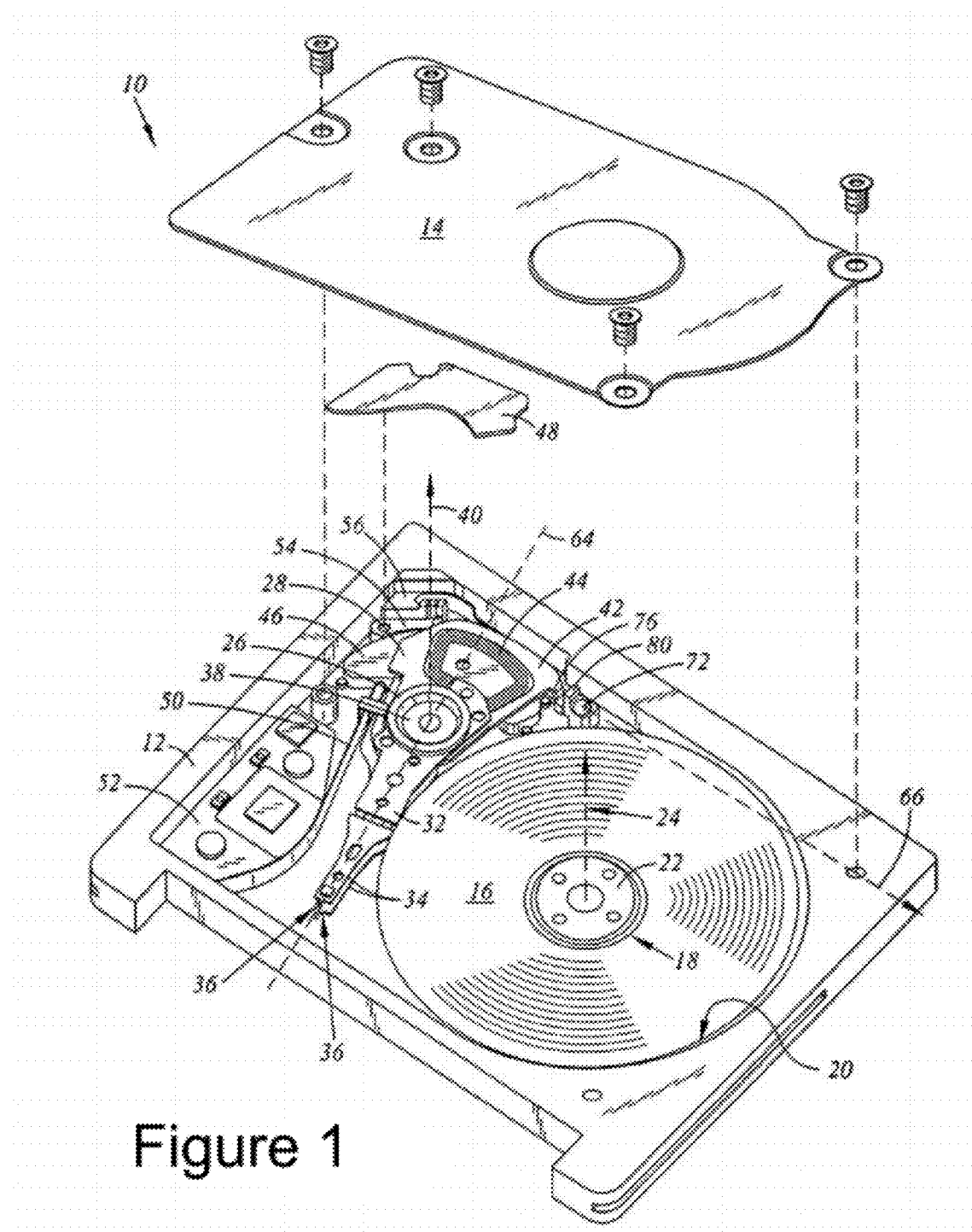
FIG. 1 depicts a perspective view of a disk drive in accordance with embodiments described herein.

Referring now to FIG. 1, there is depicted an exploded perspective view of a disk drive 10 according to embodiments described herein. The disk drive 10 includes a head disk assembly (HDA) and a printed circuit board assembly (PCBA). The head disk assembly includes a disk drive housing having disk drive housing members, such as a disk drive base 12 and a cover 14. The disk drive base 12 and the cover 14 collectively house at least one disk 16. A single disk or additional disks may be included in the disk drive.

The disk 16 includes an inner diameter (ID) 18 and an outer diameter (OD) 20. The disk 16 further includes a plurality of tracks on its recording surface, or face, for storing data. The disk 16 may be of a magnetic recording type of storage device, however, other arrangements (e.g., optical recording) may be utilized. The head disk assembly further includes a spindle motor 22 for rotating the disk 16 about a disk rotation axis 24. The head disk assembly further includes a head stack assembly 26 rotatably attached to the disk drive base 12 in operable communication with the disk 16. The head stack assembly 26 includes an actuator 28.

The actuator 28 includes an actuator body and at least one actuator arm 32 that extends from the actuator body. Some embodiments include multiple arms 32. Distally attached to the actuator arms 32 are suspension assemblies 34. The suspension assemblies 34 respectively support heads 36. The suspension assemblies 34 with the heads 36 are referred to as head gimbal assemblies. The number of actuator arms and suspension assemblies may vary depending upon the number of disks and disk surfaces utilized.

The head 36 can include a transducer for writing and reading data. The transducer can include a writer and a read element. In magnetic recording applications, the transducer's writer may be of a longitudinal or perpendicular design, and the read element of the transducer may be inductive or magnetoresistive.

In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 36 is disposed adjacent to the various data annular regions from adjacent to the outer diameter 20 to the inner diameter 18 of the disk 16. In FIG. 1, the actuator body includes a bore, and the actuator 28 further includes a pivot bearing cartridge 38 engaged within the bore for facilitating the actuator body to rotate between limited positions about an axis of rotation 40.

The actuator 28 can further include a coil support element 42 that extends from one side of the actuator body opposite the actuator arms 32. The coil support element 42 is configured to support a coil 44. A VCM magnet 46 may be supported by the disk drive base 12. Posts may be provided to position the VCM magnet 46 in a desired alignment against the disk drive base 12. A VCM top plate 48 may be attached to an underside of the cover 14. The coil 44 is positioned, in some embodiments, between the VCM magnet 46 and the VCM top plate 48 to form a voice coil motor for controllably rotating the actuator 28.

The head stack assembly 26 can further include a flex cable assembly 50 and a cable connector 52. The cable connector 52 can be attached to the disk drive base 12 and is disposed in electrical communication with the printed circuit board assembly. The flex cable assembly 50 supplies current to the coil 44 and carries signals between the heads 36 and the printed circuit board assembly.

With this configuration, current passing through the coil 44 results in a torque being applied to the actuator 28. The actuator 28 includes an actuator longitudinal axis 64 which extends generally along the actuator arms 32. A change in direction of the current through the coil 44 results in a change in direction of the torque applied to the actuator 28, and consequently, the longitudinal axis 64 of the actuator arms 32 is rotated about the axis of rotation 40. It is contemplated that other magnet, VCM plate, coil and magnet support configurations may be utilized, such as a multiple coil arrangements, single or double VCM plates and a vertical coil arrangement.

The disk drive 10 can also include a latch 54. The latch 54 can include a fixed portion 56 that is firmly coupled to the disk drive base 12. The latch 54 further includes a latching portion that is engagable with fixed portion 56 to limit rotational movement of the actuator 28. Although the latch 54 is depicted as being located in a corner of the base, the latch 54 could be located in other portions of the disk drive and still perform its functions.

When the actuator 29 is rotated into the parked position, as illustrated in FIG. 1, the actuator 28 can include a contact member 76, which can be located on the coil support element 42 or elsewhere, that is configured to engage a crash stop 80 in order to limit rotation of the actuator 28 away from the disk 16. The crash stop 80 can be an integral part of the base 12, or the crash stop 80 can be connected to the base 12 via a fixation element 72. FIG. 1 depicts an axis of engagement 66 of the contact member 76 and the crash stop 80 as being in line with the fixation element 72, but other constructions are also permissible. A crash stop 80 can also be provided to limit movement of the actuator 28 toward the ID 18 of the disk 16.

Figure 2:
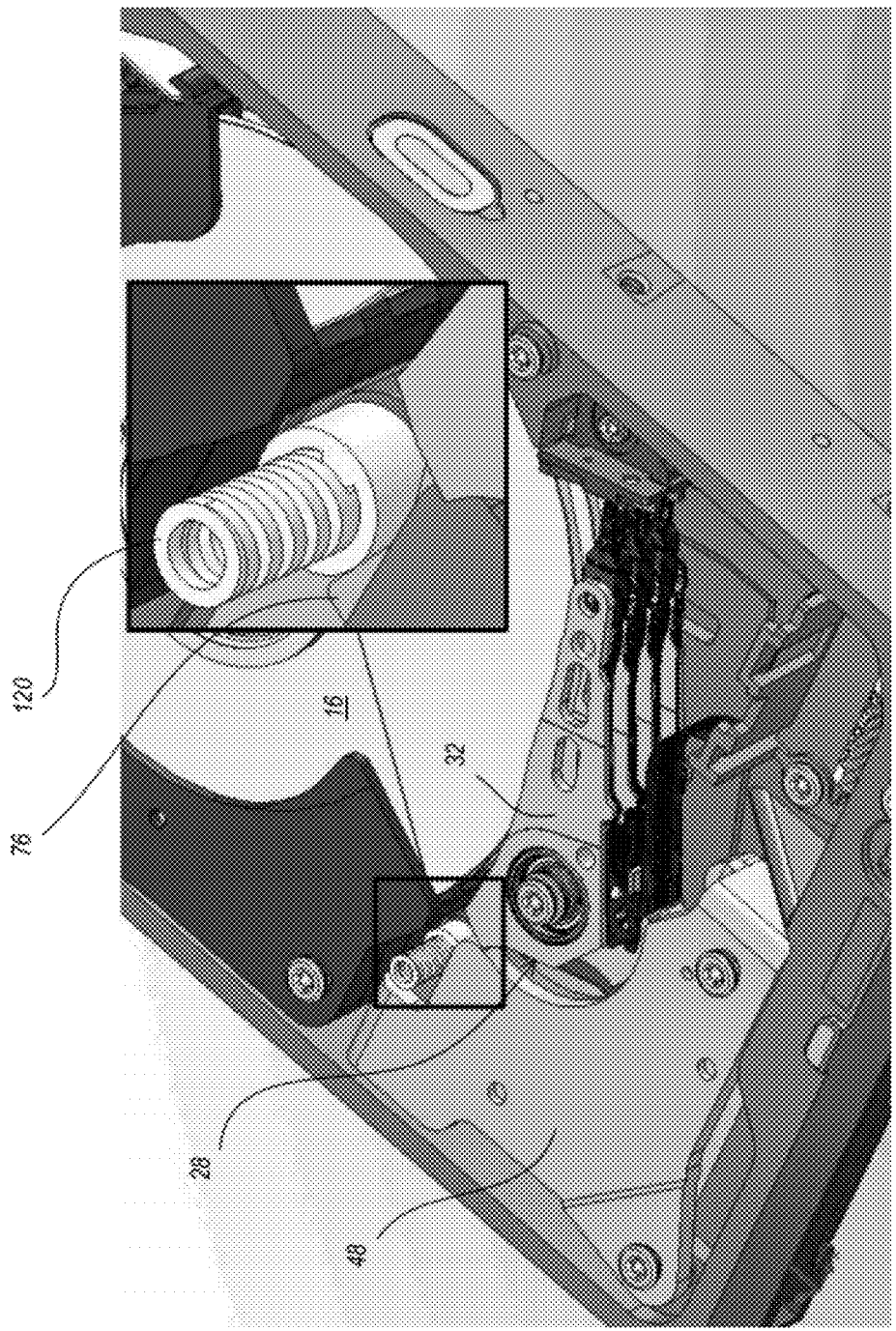
FIG. 2 depicts a partial view of a disk drive in accordance with embodiments described herein and having a partial blow up view of a portion of the disk drive.

FIG. 2 depicts a closer view of the disk drive of FIG. 1. Shown in FIG. 2 is the disk 16 and the base 12 of the disk drive having actuator arms 32 rotationally mounted therein. The top plate 48 is shown as being coupled to the base and covering a back portion of the actuator 28. A partial blowup view of a crash stop assembly 120 is also shown in FIG. 2, which illustrates the crash stop assembly 120 located at a position between the coil support element 42 and the disk 16. The coil support element 42 includes a contact member 76 that engages a portion of the crash stop assembly 120. When the actuator arm 32 is rotated away from the disk 16, and is in the park configuration. With the contact member 76 of the actuator 28 engaging the crash stop assembly 120, the actuator is not over rotate, the actuator arm 32 is properly positioned during a non-operation mode.

Figure 3:
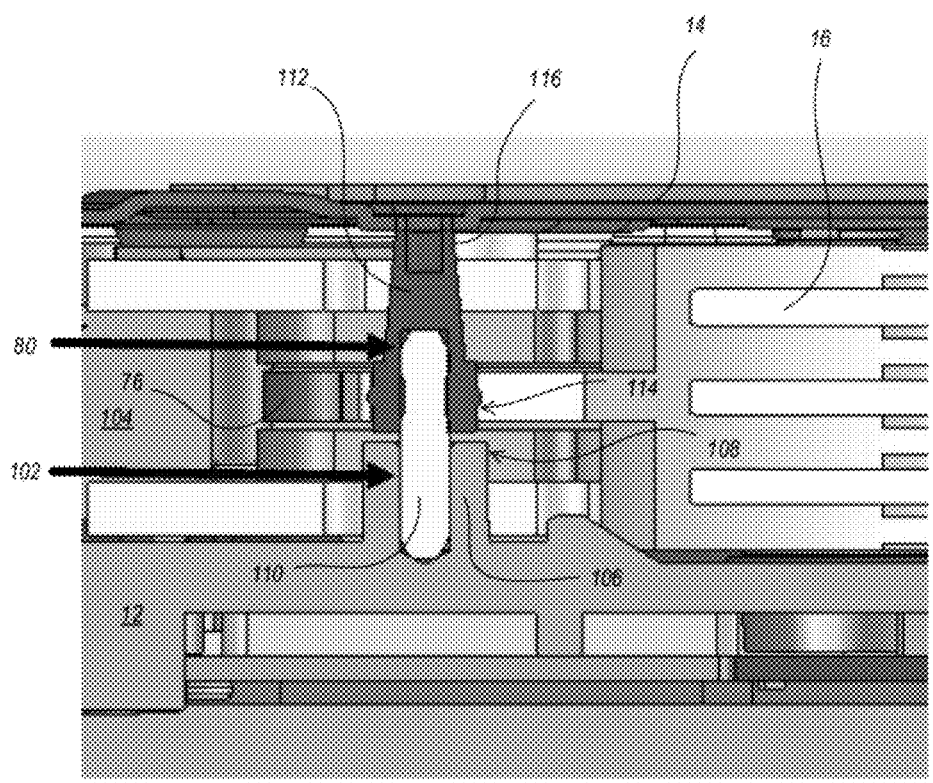
FIG. 3 depicts a schematic cross-sectional view of a disk drive with a crash stop assembly.

FIG. 3 illustrates a conventional crash stop assembly in which the base of the disk drive 12 includes a cylindrical bore 102 protruding into an internal space 104 defined by the base 12 and the cover 14 when the base 12 in the top cover 14 are coupled together. Walls 106 of the cylindrical bore 102 extend upward from the base 12 and form a receiving portion 108 into which a pin 110 is positioned.

A crash stop 112 is positioned over the pin 110 and is configured to limit rotation of the actuator body 28 by engaging the contact member 76 when the actuator body 28 is rotated to the parked position. The crash stop 112 is retained in place by engaging the pin 110 on a bottom portion 114 of the crash stop and a top portion 116 of the crash stop is engaged by the cover 14 when the top cover 14 and the base 12 are coupled together.

Some embodiments of the crash stop 112 provide that at least one of the bottom portion 114 and the top portion 116 comprises a compliant material, such that when the base 12 and the top cover 14 are coupled together, the compliant material is compressed to secure the crash stop 112 in place. The pin 110 provides a solid structure in such embodiments about which the crash stop is received, thereby providing a rigid structure to resist forces applied by the actuator 28 when rotated to the parked position and when engaged by the contact member 76.

Figure 4:
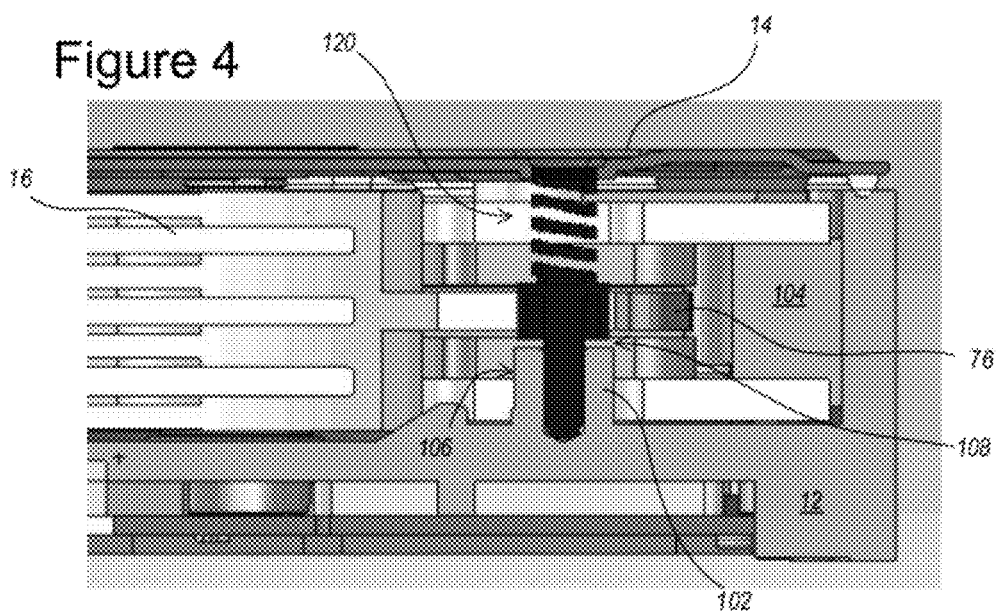
FIG. 4 depicts a schematic cross-sectional view of a disk drive with embodiments of a crash stop assembly described herein.

FIG. 4 depicts embodiments of the disk drive having a crash stop assembly 120 as described herein. In FIG. 4, the base 12 of the disk drive is shown as being coupled to a top cover 14. The base 12 defines a bore 102 that extends into the internal space 104 formed between the base 12 in the top cover 14. The base 12 includes a cylindrical wall 106 that defines a receiving portion 108, which can form a cavity in the base. With this construction, the crash stop assembly 120 can be coupled with the base 12 and secured into position between the base 12 and the top cover 14 when the base 12 and the top cover 14 are coupled together.

Figure 5:
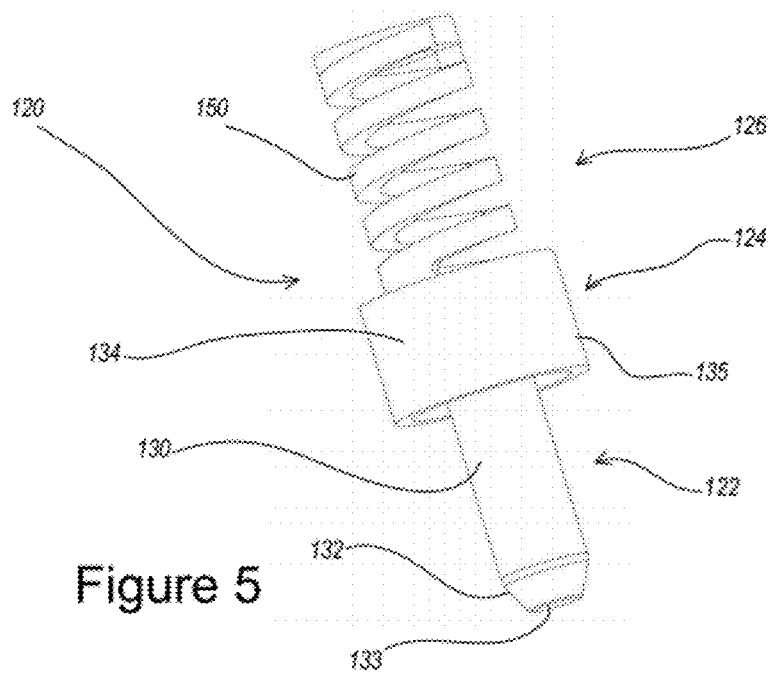
FIG. 5 illustrates a perspective view of embodiments of a crash stop assembly described herein.

FIG. 5 illustrates a perspective view of embodiments of the crash stop assembly 120 illustrated in FIG. 4. Some embodiments of the crash stop assembly 120 include a coupling section 122, a crash stop section 124, and a retention section 126. As illustrated in FIG. 4, the coupling section 122 is preferably configured to permit coupling to the base 12. The crash stop section 124 is configured to engage the contact member 76 of the actuator 28 during operation of the disk drive 10. The retention section 126 provides a flexible portion that can be elastically compressed when the base 12 and the top cover 14 are coupled together.

The coupling section 122 of the crash stop assembly 120 can, as depicted, provide an elongate portion 130 that is received within the bore 102 of the base 12. Accordingly, the base includes a first coupling section, or portion, that provides a cavity therein, with the cylindrical walls 106 substantially encircling the bore 102. When the elongate portion 130 is received within the bore 102, the crash stop assembly 120 is coupled with the base 12.

During the assembly of the disk drive 10, the crash stop assembly 120 is coupled with the base 12, for example, by inserting the elongated portion 130 into the bore 102 of the base 12. To facilitate the assembly process, a tapered portion 132 can be provided on one end of the elongate portion 130. In some embodiments, the tapered portion 132 increases in diametrical extent throughout the tapered portion 132 from an end 133 of the elongate portion 130. Accordingly, during the assembly process, the tapered portion 132 can accommodate tolerances that may exist in the manufacture of the crash stop assembly 120 and the base 12.

For example, in some embodiments, the tapered portion 132 can have a substantially conical shape. The conical shape can be angulated with respect to the elongate portion 130 by an angle of between about 15° and about 45°. In some embodiments, the conical shape can be angulated with respect to the elongate portion 130 by an angle of between about 20° and about 30°. Some embodiments, the conical shape can be angulated with respect to the elongate portion 130 by an angle of about 25°.

While the depicted embodiments in the figures and the description provided above shows the coupling portion of the disk drive 10 (e.g., the bore 102 and the receiving portion 108) as being part of the base, it is contemplated that the disk drive coupling portion can be configured to be positioned on the top cover 14 or on other portions of the disk drive 10. It is also contemplated that the coupling portion that directly engages the crash stop assembly 120 can be provided by intermediary components, or an adapter, that engages at least one of the base 12 and the top cover 14 or one portion of the crash stop assembly 120.

While the coupling section 122 of the crash stop assembly 120 is depicted as providing an elongate portion 130 that is received within a cavity or recess of the base 12 or top cover 14, it is contemplated that other coupling configurations may be provided for the coupling section 122. For example, the coupling section 122 can provide a bore that receives a protrusion extending from the base 12, top cover 14, or an adapter that is configured to couple the coupling section 122 with at least one of the base 12 and the top cover 14.

Figure 6:
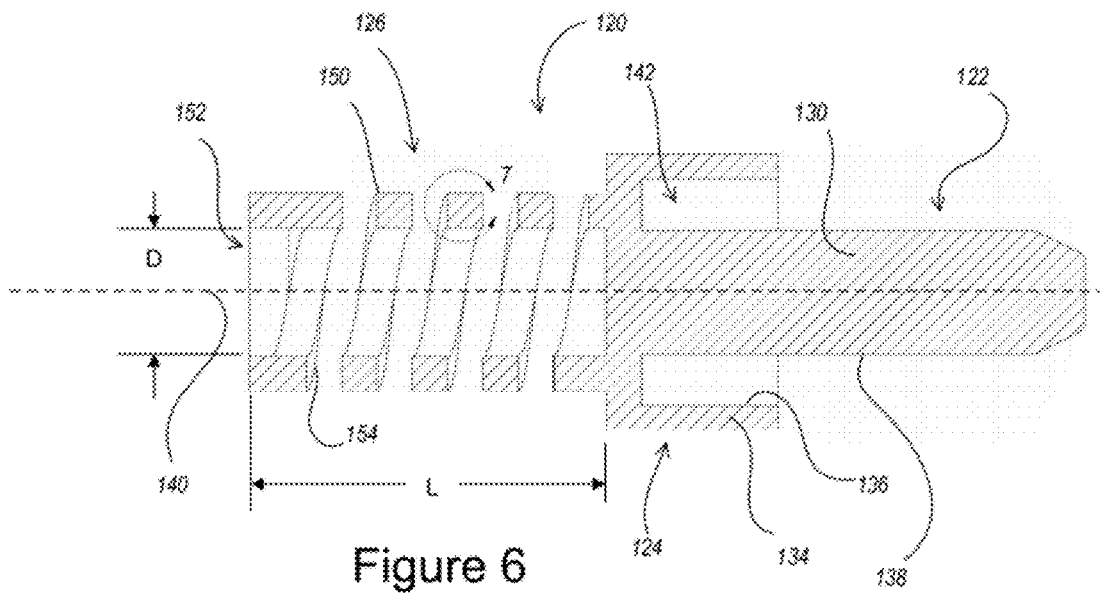
FIG. 6 illustrates a cross-sectional view of embodiments of a crash stop assembly described herein.

FIG. 6 depicts a cross-sectional view of the crash stop assembly 120. As depicted in FIGS. 5 and 6, the crash stop section 124 of the crash stop assembly 120 can include a cylindrical body 134 extending around a portion of the elongate portion 130 of the coupling section 122. While the figures depict the crash stop section 124 as having a substantially cylindrical configuration, it is contemplated that the crash stop section 124 can include any number of a variety of shapes, designs, and surfaces.

For example, while the crash stop section 124 of FIGS. 5 and 6 all depict a cylindrical body 134, the crash stop section 124 can include planar edges and corners about an outer surface 135 of the crash stop section 124. The crash stop section 124 is configured to engage the contact member 76 of the actuator 28 when the actuator 28 is rotated to the parked position, and various edges and surfaces can be configured to optimize performance of the crash stop section 124 depending on the desired functions. One of such functions can be that the crash stop section 124 is configured to be sufficiently rigid to stop rotation of the actuator 28.

FIG. 6 illustrates that the cylindrical body 134 of the crash stop section 124 can be positioned about the elongate portion 130 of the coupling section 122. In some embodiments, an inner wall 136 of the cylindrical body 134 is spatially separated from an outer wall 138 of the elongate portion 130. For example, in some embodiments, a central axis 140 is defined by the crash stop assembly 120, and the inner wall 136 of the cylindrical body 134 can be radially spaced with respect to the central axis 140 relative to the outer wall 138 of the elongate portion 130. Accordingly, in some embodiments, an annular space 142 is defined between a portion of the outer wall 138 of the elongate portion 130 and a portion of the inner wall 136 of the cylindrical body 134. The size and the shape of the annular space 142 can vary depending upon the shape of the elongate portion and the shape of the crash stop section 124.

In some embodiments, the retention section 126 of the crash stop assembly 120 extends along the central axis 140 from the crash stop section 124. As depicted in FIGS. 5 and 6, the retention section 126 can include a helical portion 150. Some embodiments provide that the helical portion 150 include a hollow bore 152 having a diameter D. The helical portion 150 can also have a length L extending from an edge of the crash stop section 124 to an end of the helical portion 150.

Some embodiments provide that the helical portion 150 defines a helix extending in a circular fashion along the central axis 140 from the crash stop section 124 to the end 154 of the helical portion 150. As used herein, and the term "helix" is used in its ordinary meaning, and is intended to be interpreted broadly, and can include, for example and without limitation, a helical configuration having a constant or a variable pitch.

Figure 7A:
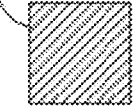
FIGS. 7A-7F depict cross-sectional view of a portion of a crash stop assembly identified in FIG. 6.
Figure 7B:
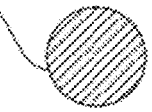
Figure 7C:
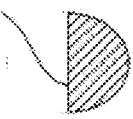
Figure 7D:
Figure 7E:
Figure 7F:

Various cross-sections of the helical portion 150 are provided in FIGS. 7A through 7F. FIG. 7A illustrates a cross section of the helical portion 150 having a substantially rectangular or square configuration. FIG. 7B depicts a cross-section of the helical portion 150 having an elliptical or circular configuration. FIG. 7C depicts the helical portion 150 having a semi-elliptical or semicircular configuration. FIG. 7D depicts the helical portion 150 having a hexagonal configuration. FIG. 7E depicts the helical portion 150 having an irregular configuration. FIG. 7F depicts the helical portion 150 having an octagonal configuration.

In operation, when the crash stop assembly 120 is coupled to one of the base 12 or top cover 14, and the base 12 and top cover 14 are coupled together, the retention section 126 is compressed along the central axis 140 and can further secure the coupling between the coupling section 122 and the base 12 or the top cover 14. The material used for the retention section 126 preferably permits the elastic deformation of the helical portion 150 and provides a slight resistance force against the coupling of the base 12 in the top cover 14. The helical portion 150 is configured to compress along the central axis 140 of the crash stop assembly 120 when the disk drive 10 is assembled. The compression of the helical portion 150 is configured to be within the limit of the helical portion 150 material's elastic deformation range. The resistance force can further act to retain the crash stop assembly 120 in its position, coupled to either the base 12 or the top cover 14.

Although the crash stop assembly 120 is depicted having the crash stop section 124 interposing the retention section 126 and the coupling section 122, other variations and configurations of the crash stop assembly 120 can be permitted. For example, in some embodiments, the retention section 126 of the crash stop assembly 120 can also include a coupling portion such that the retention section 126 and the coupling section 122 are positioned on the same side of the crash stop section 124.

Some embodiments provide that the disk drive 10 can include a base 12 and a top cover 14 that, when coupled together, define an interior space 104 of the disk drive 10, with at least one of the base 12 and top cover 14 having a first coupling portion for coupling with a crash stop assembly 120. The disk drive 10 can also include an actuator assembly 28 having at least one actuator arm 32, the actuator assembly 28 being rotatable within the interior space 104 about a rotation axis 40. As part of the disk drive 10, a crash stop assembly 120 can also be provided.

In some embodiments, the crash stop assembly 120 has a second coupling portion, which couples with the first coupling portion, a crash stop section 124, and a retention section 126. The crash stop section 124 is configured to limit rotation of the actuator assembly 28 about the rotation axis 40 when the first and second coupling portions are coupled. In some embodiments, the retention section 126 extends opposite the second coupling portion of the crash stop section 124 and includes a helical portion 150 that is elastically compressed when the base 12 and the top cover 14 are coupled together.

The helical portion 150, in some embodiments, extends along a central axis 140 of the crash stop assembly 120, and the helical portion 150 defines a hollow bore 152 extending from the crash stop section 124 along the central axis 140. The helical portion 150 can define a helix that extends along a central axis 140 of the crash stop assembly 120 from the crash stop section 124.

In some embodiments, the helix is configured to reduce in axial length L along the central axis 140 when the helical portion 150 is elastically compressed. Some embodiments provide that the helix reduces in axial length between about 0.1 mm and about 3 mm. Some embodiments provide that the helix reduces in axial length up to about 90% of a non-compressed length L of the helix or helical portion. In some embodiments, the helix reduces an axial length between about 10% and about 90% of the non-compressed length L of the helix or helical portion 150. For example, in some embodiments, the helical portion 150 is between about 5 mm and about 9 mm long. In some embodiments, the helical portion is about 7 mm long.

When compressed by coupling the base 12 and the top cover 14 together, the helical portion can reduced in length along the central axis 140 between about 0.1 mm and up to about 90% of the length of the non-compressed helical portion 150. Accordingly, the helical portion can be compressed to have an axial length, following compression, of between about 0.5 mm and 0.9 mm. In some embodiments, the compressed axial length of the helical portion 150 is about 0.7 mm.

Some embodiments provide that the diameter D of the retention section 126 hollow bore 126, or inner diameter, can be between about 2 mm and about 7 mm. In some embodiments, the diameter D can be between about 2 mm and about 3 mm, and some embodiments provide that the diameter D is about 2.6 mm.

Some embodiments of the crash stop assembly 120 provide that the helical portion 150 is integrally formed with at least one of the crash stop section 124 and the coupling section 122, which also can be referred to, in some embodiments, as a second coupling portion. The coupling section 122, the crash stop section 124, and the retention section 126 can form a unitary structure, which can include a molded polymer.

In some embodiments, the integrally formed or unitary structure of the crash stop assembly 120 can include different materials having different mechanical properties. For example, the crash stop assembly 120 can include a substantially rigid material for the coupling section 122 and a substantially compliant material for the retention section 126. In such an embodiment, the coupling section 122 can provide a secure anchoring of the crash stop assembly 120 while the retention section 126 can provide a flexible components that is compressed. When the base 12 in the top cover 14 are coupled together, thereby further securing the coupling of the coupling section 122. The substantially rigid material can include hard polymers or metals, and substantially compliant materials can include softer polymers, or polymers having a lower modulus of elasticity than that of the substantially rigid materials. In some embodiments, the crash stop assembly 120 can comprise a polyester and PTFE blend.

In some embodiments, the crash stop assembly 120 includes a crash stop section 124 having an outer wall, or cylindrical body 134, extending along a first axial length of the crash stop assembly 120 and a retaining section 126 extending from the crash stop portion 124. The retaining section 126 can include a helical portion 150 that is elastically compressible along a second axial length, different from the first axial length, of the crash stop assembly 120. Some embodiments further include a coupling section 122 that is shaped and configured to couple with the disk drive 10. The coupling with the disk drive 10 can be achieved by engaging a portion of the coupling section 122 either directly or indirectly with the base 12 or the top cover 14.

The embodiments described above, and readily recognizable by one of ordinary skill in the art as variants of the described embodiments, also provide a method for retaining a crash stop assembly 120 in a disk drive 10 having a base 12 and a top cover 14. The method can include providing a crash stop assembly 120 having a crash stop section 124, a coupling portion 122, and a helical retention portion 126. The method includes the step of coupling the coupling portion 122 to the disk drive 10. The coupling of the coupling portion 122 with the disk drive 10 can be achieved by a direct coupling of the coupling section 122 and at least one of the base 12 and the top cover 14. Some embodiments provide that the coupling of the coupling portion 122 with the disk drive 10 can be accomplished by providing an adapter that couples to the coupling section 122 and at least one of the base 12 in the top cover 14. The method also preferably includes elastically compressing the helical retention portion 126 by coupling together the base 12 and the top cover 14.

In some embodiments, the step of providing a crash stop assembly 120 can include forming the crash stop section 124, the coupling portion 122, and the helical retention portion 126 from a unitary structure. In some methods the forming can include molding the unitary structure from a polymer, and in some methods the unitary structure can include a plurality of materials that have different mechanical properties. For example, some methods may include providing a metal pin for the coupling section 122 and over-molding the metal pin with a polymer to form at least one of the crash stop section 124 and retention section 126.

The description of the invention is provided to enable any person skilled in the art to practice the various embodiments described herein. While the embodiments have been particularly described with reference to the various figures and disclosure, it should be understood that these are for illustration purposes only and should not be taken as limiting the scope of the inventions.

There may be many other ways to implement the embodiments. Various functions and elements described herein may be partitioned differently from those shown without departing from the spirit and scope of the disclosure. Various modifications to these embodiments will be readily apparent to those skilled in the art, and generic principles defined herein may be applied to other embodiments. Thus, many changes and modifications may be made to embodiments, by one having ordinary skill in the art, without departing from the spirit and scope of the disclosure.

A reference to an element in the singular is not intended to mean "one and only one" unless specifically stated, but rather "one or more." The term "some" refers to one or more. Any headings and subheadings are used for convenience only, do not limit the disclosure, and are not referred to in connection with the interpretation of the description of the disclosure. All structural and functional equivalents to the elements of the various embodiments described throughout this disclosure that are known or later come to be known to those of ordinary skill in the art are expressly incorporated herein by reference and intended to be encompassed by the disclosure. Moreover, nothing disclosed herein is intended to be dedicated to the public regardless of whether such disclosure is explicitly recited in the above description.

What is claimed is:

1. A disk drive comprising:
a base and a top cover that, when coupled together, define an interior space of the disk drive, at least one of the base and top cover comprising a first coupling portion for coupling with a crash stop assembly;
an actuator assembly comprising at least one actuator arm, the actuator assembly being rotatable within the interior space about a rotation axis; and
a crash stop assembly having a second coupling portion, which couples with the first coupling portion, a crash stop section, and a retention section, the crash stop section limiting rotation of the actuator assembly about the rotation axis when the first and second coupling portions are coupled, the retention section extending opposite the second coupling portion of the crash stop section and comprising a helical portion that is elastically compressed when the base and the top cover are coupled together.

2. The disk drive of claim 1, wherein the helical portion extends along a central axis of the crash stop assembly, and the helical portion defines a hollow bore extending from the crash stop section along the central axis.

3. The disk drive of claim 1, wherein the helical portion comprises a helix extending along a central axis of the crash stop assembly from the crash stop section.

4. The disk drive of claim 3, wherein the helix reduces in axial length along the central axis when the helical portion is elastically compressed.

5. The disk drive of claim 4, wherein the helix reduces in axial length between about 0.1 mm and about 3 mm.

6. The disk drive of claim 4, wherein the helix reduces in axial length up to about 90% of a non-compressed length of the helix.

7. The disk drive of claim 3, wherein a cross-section of the helix comprises at least one of a substantially triangular, square, rectangular, circular, elliptical, semi-circular, semi-elliptical, pentagonal, hexagonal, heptagonal, octagonal, and irregular shape.

8. The disk drive of claim 1, wherein the helical portion is integrally formed with at least one of the crash stop section and the second coupling portion.

9. The disk drive of claim 1, wherein the first coupling portion comprises a cavity in the base.

10. The disk drive of claim 9, wherein the second coupling portion comprises an elongate portion that is received by the cavity in the base.

11. The disk drive of claim 1, wherein the crash stop section comprises a cylindrical body.

12. The disk drive of claim 11, wherein the second coupling portion extends axially within the cylindrical body and an inner wall of the cylindrical body is radially spaced from an outer wall of the second coupling portion.

13. The disk drive of claim 1, wherein the helical portion defines an inner diameter of between about 2 mm to about 7 mm.

14. The disk drive of claim 1, wherein the second coupling section, the crash stop section, and the retention section form a unitary structure.

15. The disk drive of claim 14, wherein the unitary structure comprises a molded polymer.

16. A crash stop assembly comprising:
   a crash stop section extending along a first axial length of the crash stop assembly;
   a retaining section extending from the crash stop section, the retaining section comprising a helical portion that is elastically compressible along a second axial length, different from the first axial length, of the crash stop assembly; and
   a coupling section that is configured to couple with a disk drive, wherein the coupling section extends, from the crash stop section, in a direction opposite the retaining section.

17. The crash stop assembly of claim 16, wherein the crash stop section, the retaining section, and the coupling section form a unitary structure.

18. The crash stop assembly of claim 17, wherein the unitary structure comprises a molded polymer.

19. The crash stop assembly of claim 16, wherein the helical portion defines a hollow bore extending axially along the helical portion.

20. The crash stop assembly of claim 16, wherein the helical portion is elastically compressible by a length of between about 0.1 mm and about 90% of a non-compressed length of the helical portion.

21. The crash stop assembly of claim 16, wherein the crash stop section and the retaining section are integrally formed.

22. A method for retaining a crash stop assembly in a disk drive having a base and a top cover, the method comprising:
   providing a crash stop assembly having a crash stop section, a coupling portion, and a helical retention portion, wherein the coupling portion extends, from the crash stop section, in a direction opposite the helical retention portion;
   coupling the coupling portion to the disk drive; and
   elastically compressing the helical retention portion by coupling together the base and the top cover.

23. The method of claim 22, wherein the coupling portion is coupled to a base of the disk drive.

24. The method of claim 22, wherein the providing comprises forming the crash stop section, the coupling portion, and the helical retention portion from a unitary structure.

25. The method of claim 24, wherein the forming comprises molding the unitary structure from a polymer.

* * * * *